2,812,241
PROCESS FOR FORMING CRYSTALLINE MAGNESIA OF HIGH PURITY AND OF HIGH DENSITY

Leslie W. Austin, deceased, late of San Jose, Calif., by Wallace O. Austin, administrator, San Jose, and Clarence A. Rick, Gilroy, Calif., assignors to Kaiser Aluminum & Chemical Corporation, Oakland, Calif., a corporation of Delaware No Drawing. Application November 16, 1953,
Serial No. 392,466

13 Claims. (Cl. 23—201)

This invention relates to a method for forming crystalline magnesia, or periclase, of high purity and of density, with decreased effective surface, with the aid of mineralizers which enable crystallization to take place at temperatures readily obtainable in ordinary kilns and within rather short periods of treatment.

Magnesium oxide of high purity has been known to be very difficult to prepare in dense crystalline form, that is in the form of well-crystallized agglomerates of low porosity. It has been known to heat such material at high temperatures, in excess of 2000° C., to effect suitable crystallization thereof. However, even when heated to as high as 2200° C., nonfused periclase so made has been known to exhibit appreciable porosity. Temperatures of 2000° C. and higher are, however, very difficult to attain in fuel-fired furnaces and therefore this process is not economically satisfactory with respect either to the product obtained or the operation of the method itself. Fusion in an electric furnace has also been known in crystallizing high purity magnesia but results in a product which is rather inert and is therefore unsatisfactory for some purposes. For example, it is very difficult to bond electrically fused magnesia, or periclase, grains into a ceramic product or article useful at high temperatures, and particularly under load.

For many years, it has been common practice to admix with magnesia considerable amounts, e. g. from 5% to 15%, of fluxing impurities such as silica, lime, alumina and iron oxide in order to enable burning the magnesia at temperatures, e. g. not over about 1800° C., conveniently attainable in commercial equipment. Such additions have had the necessary result of lowering the refractoriness and the hot load strength, and have other disadvantages.

It is an object of this invention to provide a method of forming crystallized magnesia, or periclase, of increased density and decreased effective surface; and to attain this result without fusion of the material and without the addition of fluxes which lower the refractoriness and hot load strength. It is a further object to provide a method of forming magnesia refractory grain or aggregate, or periclase agglomerates, of improved characteristics, especially with regard to higher density, hardness of the grain or resistance to impact. It is a further object of the invention to provide a magnesia refractory grain, or periclase, of the improved characteristics. Other objects will appear from the description below.

According to the present invention, improved crystallization and a dense, hard, well-crystallized magnesia agglomerate are obtained by intimately admixing a magnesium compound which forms periclase upon firing and a small amount of boron material and a small amount of chromium material, and firing to form periclase. Boron material is added in an amount to provide from 0.25% to 5.0%, boron calculated as $B_2O_3$ on the fired basis. In a preferred practice, from 1% to 2% of boron material, so calculated, is added to obtain low porosity and improved hardness and toughness of the grain. Chromium material is added in an amount to provide from 0.10% to 2.0%, preferably from 0.1% to 0.75%, chromium calculated as $Cr_2O_3$ on the fired basis.

The periclase-yielding starting material is a compound of magnesium which will form magnesia, magnesium oxide, upon calcining; and which will yield periclase upon firing. Such a compound can be magnesite, brucite or other suitable natural magnesia ore, or magnesium carbonate, magnesium basic carbonate, magnesium hydroxide, magnesium acetate, magnesium alcoholate and the like. Another suitable starting material is cryptocrystalline, or incompletely crystallized magnesia, such as, for example, that generally called "active" magnesia. Hydrated magnesia is also improved by the present process. That invention is particularly effective with high purity starting materials, which are ordinarily difficult to crystallize satisfactorily, and with such materials in finely divided form. The invention is of special advantage in treating finely divided precipitated magnesium compounds, such as magnesium carbonate or basic carbonate, or magnesium hydroxide, as well as finely divided active magnesia. There can also be employed finely divided natural magnesite ore, especially an ore of high purity. Mixtures of these can be used.

The boron material which is employed in this invention is added in thorough and intimate admixture with the magnesia-yielding starting material. This thorough interdispersion can be effected by admixing the starting components in the form of finely divided powders, or by adding the boron component as a dispersion in a liquid. An especially advantageous embodiment comprises adding the boron material as a solution. Water is the preferred solvent because of its availability and low cost, but any other liquid solvent for the boron material such as, in some cases, alcohol, glycerin or acetone can be employed. The boron material useful in this invention is boron or a compound thereof, such as an organic boron compound or a boric acid or a metal salt of a boric acid. Preferably, the boron material which is added is boric acid, for example, ortho-, meta-, pyro- or tetraboric acid, or a salt of boric acid, such as sodium tetraborate, magnesium ortho-, meta-, or pyroborate, calcium meta- or tetraborate, potassium meta-, tetra-, penta- or perborate, or other alkali or alkaline earth or ammonium salt of one of the boric acids indicated above. Mixtures of the boron materials can be employed.

The chromium material useful in this invention is preferably added in thorough and intimate admixture with the magnesia-yielding compound. This is advantageously effected by adding the chrome material as a dispersion in a liquid, or in solution. Water is a preferred solvent for the chrome material but any other solvent therefor can be used. For instance, chromic sulfate in one form is more soluble in alcohol than in water, and in such case alcohol can be employed as the solvent, or liquid dispersing medium. The chromium compounds which can be added in the method of this invention includes for example, chromic acid, magnesium chromate and dichromate, ammonium chromate and dichromate, chromium sulfate, chromium chloride, chromium nitrate, the chromates and dichromates of the alkali metals, the chromates and dichromates of the alkaline earth metals, chromium acetate, chromium oxide, chromite, chromium metal, etc. Mixtures of chromium materials can be employed.

The method of the invention comprises intimately admixing finely divided periclase-yielding material, a small amount of the boron material and a small amount of chromium material. The components can be admixed in any sequence. For instance, the boron material and chromium material can be first mixed together and then the whole thoroughly dispersed in the mass of magnesium compound to be treated. Alternatively, all of the components can be added to a mixing zone simultaneously, or in any other desired manner. It is especially advantageous, in making a very dense grain or agglomerate, to press an admixture of crytocrystalline or microcrystalline magnesia and the boron material and chromium material, and then to fire to periclase, i. e. to crystallization equilibrium. Such admixture can be prepared in various ways, as desired. It can be made, for example, by calcining the magnesia-yielding material described above to form active magnesia, for instance, to form magnesia having a bulk density of not more than about 1.5 gms. per cc. when measured on a sample thereof ground in a ball mill to pass 200 mesh, and then admixing the crystallizing components therewith, pressing and firing. Or, it can be prepared by admixing magnesia-yielding material and the crystallizing components, calcining the admixture to an active state, that is, to form cryptocrystalline magnesia containing the other components, and then pressing and firing. In this embodiment of the invention, the crystallizing components may be present in the calcined product as the oxides or they may have entered into combination with the magnesia or with each other, or, possibly, may be at least partly in solid solution in the magnesia. Whatever the state in which they exist, the final periclase obtained is very dense, and suitable for refractory use or other use. Alternatively, part of the total crystallizing additive, or one of the ingredients thereof, can be added to the magnesia-yielding starting material, the admixture calcined to form cryptocrystalline magnesia, and then the remaining ingredient or ingredients or portion thereof admixed with the calcined material, the whole pressed and fired as described. If desired there can be mixed with the cryptocrystalline magnesia-containing material up to 90% of finely divided well-crystallized periclase, and the mass pressed and fired as described.

In calcining to obtain a cryptocrystalline magnesia as described herein, it is preferred to employ a moderate temperature, such as not more than 1200° C., and preferably for not more than one hour. Higher temperatures can be employed, but with shorter times of heating, in order to avoid shrinkage and more complete crystallization of the material. In firing the mixed materials to obtain well-crystallized periclase a temperature of at least 1300° C. is employed. Preferably, the firing temperature is from about 1500° C. to about 1800° C. In other words, the material is fired to periclase at a temperature and for a time to substantially effect crystallization equilibrium. It is sometimes advantageous to fire in a reducing atmosphere.

As stated previously, the components can be mixed as dry finely divided powders, in which case each component is preferably of a particle size substantially entirely passing a No. 200 screen, or the crystallizing components (boron material and chromium material) can be admixed as solutions with the finely divided solid magnesia-yielding compound, or the crystallizing compounds can be employed in the form of a suspension thereof in a liquid. If desired, the crystallizing components can be added to a magnesium salt solution, and $Mg(OH)_2$ precipitated therefrom by addition of an alkaline material in the known way, to recover an intimate admixture of precipitated $Mg(OH)_2$ and crystallizing components.

The present process is effective and advantageous in producing well-crystallized periclase and excellent refractory agglomerates at moderate firing temperatures, as disclosed elsewhere herein, and in relatively short periods of firing, e. g. firing can be conducted for less than an hour or for less than one-half hour with very good results. A very dense product is obtained. For instance, porosity of the fired grain has been found to be as low as 5%, or even less than that. Large individual crystals of periclase are formed, also. The grain obtained is very tough and resistant to impact.

In a variation of the present process, especially where it is desired to fire the admixture directly in a rotary kiln, and more particularly when the admixture is introduced into a kiln as a water slurry or sludge, it is advantageous to add also a small amount of finely divided silica. The silica is of such particle size as to exhibit a specific surface of at least 6000 square centimeters per gram. Such silica can be diatomaceous earth, silica recovered by air separation in quartz grinding processes, or the so-called "volatilized" silica which is recovered as a deposit from the fumes issuing from a reaction zone wherein silica is being reduced to form a volatile reactive product. For instance, such silica is recovered as a deposit from the fumes or vapors issuing from a zone wherein silica, iron and carbon are reacted to form ferrosilicon and a volatile material believed to be silicon monoxide. The latter goes off with the vapors and is believed to be reoxidized to form silica. Silica is recovered as a deposit from the vapors in the form of minute spheres of amorphous $SiO_2$ having an average specific surface of around 67,000 square centimeters per gram, and being of high purity. Amorphous silica is a preferred additive in the variant process of the present invention. The silica is added when silica otherwise present as impurity in the mix is less than 2.0%, and is added in an amount to provide a total $SiO_2$, upon analysis, of not over 2.0%, all analyses being calculated on the fired basis. For instance, if the magnesia material employed, and the rest of the mixture, contains 1.5% $SiO_2$ as impurity, there is added in this variation a small amount, less than 0.5%, of the finely divided silica, in intimate admixture, and the whole then fired. It is found that such addition of silica provides or ensures larger grain sizes, i. e. improved balling of the material, especially when firing in a rotary kiln.

The following examples will illustrate more clearly the process of this invention, and the products which are the subjects of the invention.

EXAMPLE I

Magnesium hydroxide is produced by reacting sea water with dry, calcined dolomite by the process shown in Vettel and Israel, U. S. 2,595,314, issued May 6, 1952. The filter cake recovered, after washing and filtering the precipitated product has the following analysis on the ignited basis: 0.8% $SiO_2$, 1.2% $R_2O_3$ (0.6% $Fe_2O_3$, 0.6% $Al_2O_3$), 1.2% CaO, 96.8% MgO (by difference).

It is divided into batches, and each batch is admixed with the crystallization promoters as shown in the table below, one batch being fired as a blank, without any additives. The chromium material is added as chromic acid $CrO_3$; and the boron material, as boric acid $H_3BO_3$. Each material is added, in solution in water, to a batch of filter cake in amounts to provide the quantities of respective oxides noted, on the fired basis. Sufficient water is added to each batch to provide a total of 900 cc. water per 3 lbs. filter cake. The resultant slurry is dried and pulverized; and is then mixed with 10% water. This mixture is pressed into pellets and dried, and the pellets are placed in a pot kiln and fired at about 1700° C. for one-half hour. The porosity of a sample of each fired batch is determined by the method described hereinafter and the results are shown in Table 1. The amounts of boron compound and chromium compound added are calculated as $B_2O_3$ and $Cr_2O_3$, respectively, on the fired basis.

*Table 1*

| $B_2O_3$, Percent Wt. | $Cr_2O_3$, Percent Wt. | Porosity, Percent Vol. |
| --- | --- | --- |
| Blank | ----- | 13.0 |
| None | 0.25 | 7.8 |
| None | 0.5 | 11.9 |
| None | 1.0 | 12.4 |
| None | 2.0 | 12.1 |
| 0.25 | 0.25 | 6.6 |
| 0.5 | 0.25 | 4.7 |
| 1.0 | 0.25 | 4.1 |
| 2.0 | 0.25 | 5.1 |

It can be seen from the table that the decrease in porosity when both components are added is much greater than with chromium material alone.

EXAMPLE II

Batches are made up and treated in exactly the same way as in Example I, except that chromic chloride is employed instead of chromic acid and that a series is prepared in which boric acid is the only additive employed. The firing results with respect to porosities are shown in Table 2.

*Table 2*

| $B_2O_3$, Percent Wt. | $Cr_2O_3$, Percent Wt. | Porosity, Percent Vol. |
|---|---|---|
| Blank | None | 14 |
| 0.25 | None | 18 |
| 0.5 | None | 22 |
| 1.0 | None | 16 |
| 2.0 | None | 10 |
| 0.25 | 0.25 | 11 |
| 0.5 | 0.5 | 9.5 |
| 1.0 | 1.0 | 10 |
| 2.0 | 2.0 | 8 |
| 0.5 | 0.25 | 9 |
| 1.0 | 0.25 | 6.6 |
| 1.5 | 0.25 | 5.5 |
| 2.0 | 0.25 | 5.5 |

It can be seen that the porosities of the batches containing both chromium material and boron material are essentially lower than those of the batches containing boron material and, in fact, the addition of the latter alone apparently tends to increase the porosity of the product.

EXAMPLE III

In another series of tests, another amount of filter cake prepared by the method as mentioned in Example I has the following analysis on the ignited basis: 1.01% $SiO_2$, 1.34% CaO, 0.47% $R_2O_3$ (including $Al_2O_3$, $Fe_2O_3$ and $B_2O_3$), and 97.18% MgO by difference. It is divided into a number of batches and each is admixed with borax and chromite in the amounts shown in Table 3. The borax is added as powder of a size passing 325 mesh; and the chromite, as powders passing 270 mesh. The chromite is Philippine chromite containing about 30% $Cr_2O_3$. Each batch is thoroughly admixed, there is added about 10% water to plasticize with thorough mixing, and the whole is pressed into briquets and fired at 1600° C. to 1640° C. for 2 hours. The results of these tests are shown in Table 3, below, which as in the other tables shows the amounts of boron material and of chromium material added in the manner described, and the porosity, in percent by volume, of the fired products. In all the tables, the boron addition is calculated as $B_2O_3$, and the chromium addition, as $Cr_2O_3$.

*Table 3*

| Test No. | Borax, percent Wt. as $B_2O_3$ | Chromite, percent Wt. as $Cr_2O_3$ | Porosity, percent Vol. |
|---|---|---|---|
| 1 | 0.00 | 0.00 | 17.3 |
| 2 | 0.50 | 0.25 | 14.0 |
| 3 | 1.00 | 0.25 | 12.2 |
| 4 | 2.00 | 0.25 | 11.3 |
| 5 | 2.00 | 0.50 | 9.3 |
| 6 | 2.00 | 2.00 | 6.6 |
| 7 | 1.00 | 1.00 | 10.8 |
| 8 | 0.50 | 1.50 | 11.3 |

In all of the products of Table 3, the ease of fracture is found to be from "hard" to "very hard." When the firing temperature is 1700° to 1720° C., the ease of fracture rating is "extremely difficult."

Apparent porosity is measured, in the present specification, by mercury displacement and upon a sample of sizes passing 6 mesh and retained on 10 mesh, employing vacuum to remove entrained air.

Some of the elements disclosed as useful in this invention often occur as impurities in magnesium hydroxide recovered from various natural sources. For instance, boron and silica are generally present in the $Mg(OH)_2$ obtained as described in Example I. It has been observed, and is demonstrated by the blanks of the various examples, that the beneficial results of the present method are not produced by these naturally occurring inclusions. It may be that the natural impurities are not properly distributed, but, in any case, a recitation of the percentage of crystallizing component present or added is to be understood to mean that such percentage is the amount added by the method of the present invention, and does not include the oxide of the particular element which may be present as naturally occurring impurity. It has been noted that a great deal of the boron material added apparently volatilizes off during firing. In some instances only about 50%, and sometimes as low as one-third, of the amount added is found remaining in the fired periclase.

Preferably, the magnesia starting material is of high purity. The invention is particularly efficacious in treating magnesium compounds which yield, upon firing, periclase containing at least 95.0% MgO, and not over 2.0% $SiO_2$ and not over 2.0% CaO.

It is a particular advantage of this invention that a well-crystallized high-purity magnesia grain can be obtained by firing at temperatures considerably lower than are required for firing magnesia of such purity without the added compounds. This invention enables firing such magnesia in a rotary kiln to obtain the desired crystallization, or at an equivalent temperature and for an equivalent time. If desired, the admixed substances, if in slurry form, can be introduced directly into the rotary kiln, and dried and fired in one operation. It has been observed that the additions of the substances noted initiate crystallization of magnesia at lower temperatures, mature the crystallization more rapidly, and produce better crystallization than is obtained with the untreated magnesia. This invention enables the production of well-crystallized periclase by firing at temperatures not over about 1800° C. and for periods not exceeding about an hour. The product, because of its dense structure, high purity, low residual shrinkage, and toughness, is desirable for use in a number of fields. It is highly useful, for instance, for refractories, heat-exchange media and abrasives.

In this specification and claims porosity where expressed is in percentage by volume and other percentages and parts are by weight.

In conformity with common practice in reporting chemical analyses of refractory materials, in the specification and claims the proportions of the various chemical constituents present in a material are given as though these constituents were present as the simple oxides. Thus, the magnesium constituent is referred to as magnesium oxide or MgO, the boron constituent as $B_2O_3$, the chromium constituent as $Cr_2O_3$, the silicon constituent as $SiO_2$, and so on for other elements reported, although the silica or chromium oxide and a very small proportion of the MgO, for example, may be present in combination with each other or with another minor constituent. For example, the term "1.0% chromium calculated as $Cr_2O_3$," is intended to mean that a chemical analysis of the material referred to would show the chromium content as 1.0% expressed as $Cr_2O_3$, although in reality all of the chromium might be present in the form of magnesium chromite or in some other combined form.

The term "magnesium compound which will yield periclase upon firing," or "magnesia-yielding" or "periclase-yielding compound" is intended to include cryptocrystalline magnesia, or amorphous magnesia, as well as magnesium compounds such as magnesium hydroxide, magnesium carbonate or basic carbonate, magnesium alcoholate, magnesium acetate and the like which upon firing yield magnesia or periclase. The dispersing of the added compounds in the liquid is intended to include the employment of a solution of the compounds and also of a suspension thereof. Where solid substances are admixed in this invention, they are in finely divided dry state, preferably passing through a 200 mesh screen, or are suspended in a tempering liquid. It is to be understood that the amount of boron material component or of chromium component shown can be varied as desired, within the limits described but including both components, in accordance with varying characteristics of the starting magnesia material, and results desired. It may be desirable to use a greater or less amount of either component to obtain optimum results according to the invention. The screen sizes given herein are those of United States Standards screens.

The above examples and specific description have been given for purposes of illustration only, and variations and modifications can be made therein without departing from the spirit and scope of the appended claims. Having now described the invention, what is claimed is:

1. A process for preparing dense periclase refractory material which comprises intimately admixing a finely divided magnesium compound which forms periclase upon firing, containing at least 95.0% MgO, not over 2% $SiO_2$ and not over 2% CaO on an ignited basis, a boron material as a crystallization promoter, said boron material being added in an amount to provide 0.25% to 5.0% by weight boron as added calculated as $B_2O_3$ on the fired basis, a chromium material in an amount to provide from 0.10% to 2.0% by weight thereof as added, calculated as $Cr_2O_3$ on the fired basis and firing said admixture without fusion to form well crystallized periclase.

2. Process as in claim 1 wherein said magnesium material is precipitated magnesium hydroxide.

3. Process as in claim 1 wherein said magnesium material is finely divided magnesite.

4. Process as in claim 1 wherein said boron material is at least one compound chosen from the group consisting of orthoboric acid, metaboric acid, pyroboric acid, tetraboric acid, alkali metal salts of said acids, alkaline earth metal salts of said acids and ammonium salts of said acids.

5. Process as in claim 1 wherein said chromium material is chromic acid.

6. Process as in claim 1 wherein said boron material is added in solution in water.

7. Process as in claim 1 wherein said chromium material is added in solution in water.

8. Process as in claim 1 wherein said boron material is added in an amount to provide from 1% to 2% by weight of added boron calculated as $B_2O_3$ on the fired basis.

9. Process as in claim 1 wherein said chromium material is added in an amount to provide from 0.1% to 0.75% by weight added chromium calculated as $Cr_2O_3$ on the fired basis.

10. Process as in claim 1 wherein said admixture is pressed and then fired to form well crystallized periclase.

11. Process as in claim 1 wherein said material is fired at a temperature of from 1500° C. to 1800° C. to form well crystallized periclase.

12. A process for preparing dense periclase refractory material which comprises intimately admixing a finely divided periclase-forming magnesium compound containing at least 95.0% MgO, less than 2.0% $SiO_2$ and not over 2.0% CaO on the ignited basis, boron material as a crystallization promoter in an amount to provide from 0.25% to 5.0% by weight of added boron calculated as $B_2O_3$ on the fired basis, chromium material in an amount to provide from 0.10% to 2.0% by weight of added chromium calculated as $Cr_2O_3$ on the fired basis, and an amount of silica to provide a total silica content of not over 2.0% by weight on the fired basis, said silica being of a particle size having at least 6000 square centimeters per gram specific surface, and firing said admixture without fusion to form well crystallized periclase.

13. In the process of preparing well crystallized periclase, the steps which comprise pressing an intimate admixture of crypto-crystalline magnesia containing at least 95.0% MgO and not over 2.0% $SiO_2$ and not over 2.0% CaO on the ignited basis, boron material in an amount to provide from 0.25% to 5.0% by weight of added boron calculated as $B_2O_3$ on the fired basis, a chromium material in an amount to provide from 0.10% to 2.0% by weight of added chromium calculated as $Cr_2O_3$ on the fired basis, and firing said pressed admixture at a temperature of at least 1300° C. but without fusion to form a well crystallized periclase.

References Cited in the file of this patent

UNITED STATES PATENTS

| | | |
|---|---|---|
| 2,178,983 | Wienert | Nov. 7, 1939 |
| 2,398,743 | Heath et al. | Apr. 16, 1946 |
| 2,405,055 | Robinson et al. | July 30, 1946 |
| 2,487,290 | Austin et al. | Nov. 8, 1949 |
| 2,571,101 | Austin | Oct. 16, 1951 |
| 2,571,983 | Woodward | Oct. 16, 1951 |
| 2,641,531 | Austin et al. | June 9, 1953 |

UNITED STATES PATENT OFFICE

CERTIFICATE OF CORRECTION

Patent No. 2,812,241                            November 5, 1957

Leslie W. Austin, deceased, by
Wallace O. Austin, administrator, et al.

It is hereby certified that error appears in the printed specification of the above numbered patent requiring correction and that the said Letters Patent should read as corrected below.

Column 2, line 14, for "That invention" read -- The invention --.

Signed and sealed this 5th day of January 1960.

(SEAL)
Attest:

KARL H. AXLINE                                 ROBERT C. WATSON
Attesting Officer                             Commissioner of Patents